SEMICONDUCTOR RESISTOR CONTAINING INTERSTITIAL AND SUBSTITUTIONAL IONS FORMED BY AN ION IMPLANTATION METHOD

Filed Jan. 20, 1966

3 Sheets-Sheet 1

INVENTOR
CLAUD M. KELLETT
WILLIAM J. KING
FREDERICK W. MARTIN
BY Francis J. Thornton
ATTORNEY INVENTOR
CLAUD M. KELLETT
WILLIAM J. KING
FREDERICK W. MARTIN
BY Francis J. Thornton
ATTORNEY INVENTOR
CLAUD M. KELLETT
WILLIAM J. KING
FREDERICK W. MARTIN
BY Francis J. Thornton
ATTORNEY 3,341,754

SEMICONDUCTOR RESISTOR CONTAINING INTERSTITIAL AND SUBSTITUTIONAL IONS FORMED BY AN ION IMPLANTATION METHOD

Claud M. Kellett, Lexington, William J. King, Reading, and Frederick W. Martin, Boston, Mass., assignors to Ion Physics Corporation, Burlington, Mass., a corporation of Delaware Filed Jan. 20, 1966, Ser. No. 521,966
8 Claims. (Cl. 317—234)

ABSTRACT OF THE DISCLOSURE

A method of producing precision resistors in a body of semiconductor material consisting of irradiating selected regions of the body with ions, capable of moving into substitutional positions under the influence of heat, to implant the ions in the regions and partially annealing the body to move a statistical number of the implanted ions into substitutional positions in the semiconductor lattice and thus vary the resistance of the implanted region.

The following invention relates generally to resistors and more particularly to a novel method of producing precision resistors and the structures resulting therefrom.

At present, resistors are made in a number of ways and are defined as electrical components which offer resistance to the flow of current. Commonly, precision resistors which are within 1% of a central value are either coils of fine wire or a composition carbon rod and are quite large physically. Such resistors are unsatisfactory for the more compact circuits now desired by circuit designers. To this end, much work has been done in producing so-called integrated circuits by means of a number of processes. One of the better known and widely used processes known to the art as the "planar" process. Since this process uses diffusion, it is impossible to manufacture resistors to within better than 20% of a center point without setting each resistor by hand. Because of the necessity of such hand adjustment of the resistance value, integrated circuits using resistors either carry a premium price or are provided with wide circuit tolerances which degrade the circuit performance.

The present invention was conceived in order to mass produce resistors in substrates, suitable for integrated circuits and the like, which will have a resistance value within 1% of a desired resistance without hand trimming of its resistance value.

Thus, the present invention provides a means whereby substantially identical precision resistors may be readily and inexpensively produced.

Furthermore, by a novel trimming method, the resistance value of such resistors can be adjusted to within 0.1% of a desired point.

Broadly speaking, these advantages are achieved by ion implantation of a selected material into a body of semiconducting material having a high bulk resistivity.

Further advantages and features of the present invention will become apparent from the following specification taken in conjunction with the drawings wherein.

Figures 1, 2, 3, 4, 7:
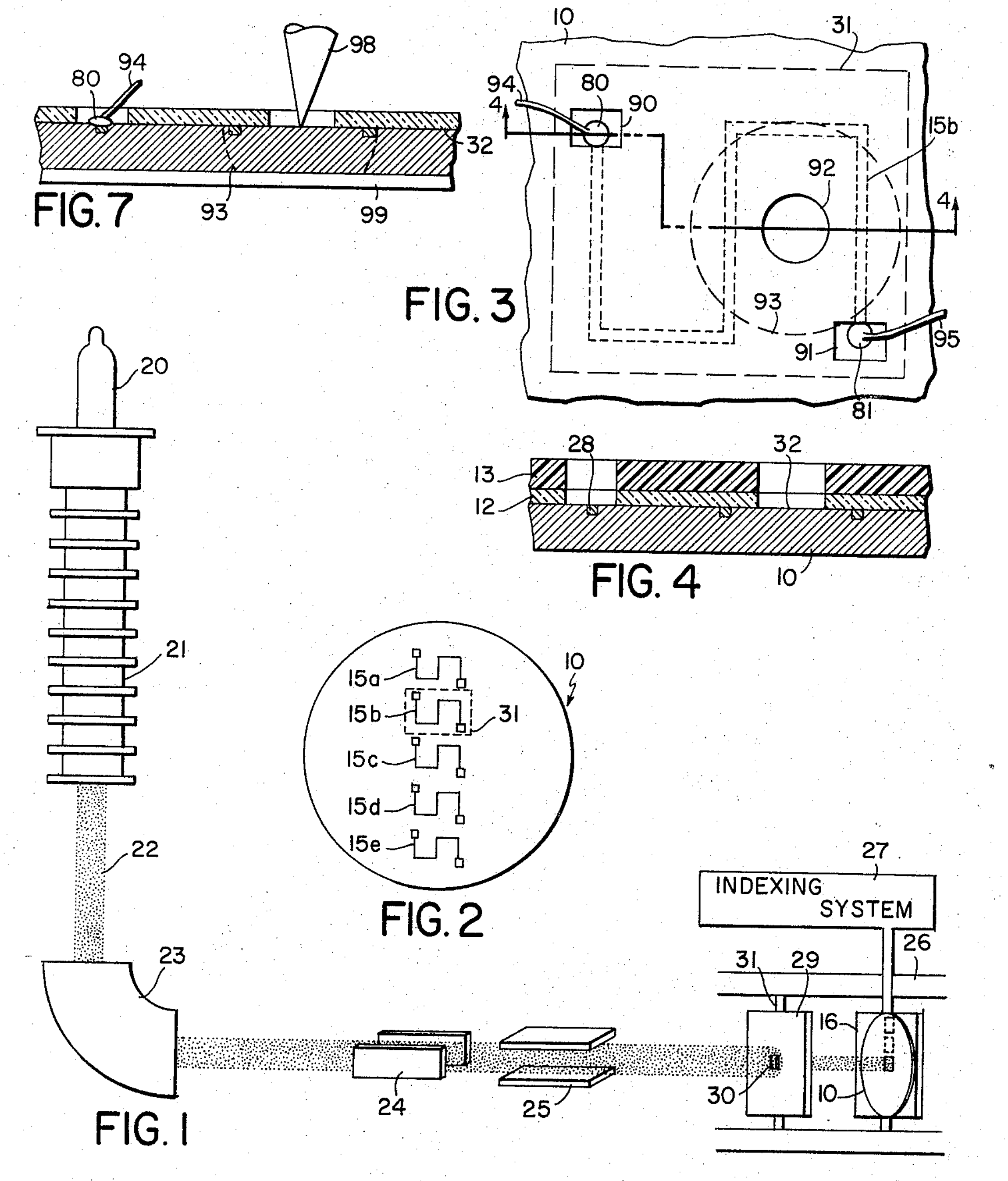
FIGURE 1 is a schematic illustration of the ion implantation apparatus used in producing such precision resistors.
FIGURE 2 is a top view of a semiconductor slice in which an array of resistors have been fabricated.
FIGURE 3 is a greatly enlarged top view of one implanted resistor element shown in FIGURE 2.
FIGURE 4 is a section of the device of FIGURE 3 taken along the lines 4—4.
FIGURE 7 is a section of the device of FIGURE 3 along the line 4—4 after contacts have been added.

Referring now to the drawings and more particularly to FIGURES 1 through 4 thereof, there is shown a body of semiconductor material 10, such as N-type silicon, whose resistivity is selected to be in the order of 100 ohm-cm. and which has on one surface thereof a thermally grown oxide or a sputtered quartz layer 12 approximately 1,000 angstroms thick. Such N-type silicon slices are well known to the semiconductor art and are commercially available. The method of sputtering quartz layers is fully set forth in a copending application of William King, Ser. No. 464,365, filed June 6, 1965, entitled formation of tenacious deposits, and assigned to the same assignee as the present invention.

Layer 12 following deposition is masked by using a standard photoresist material 13. Other materials for masking, such as wax and metal films, may also be used. However, photoresist material is preferred since sharper resolution of the masked areas may be achieved. This masking leaves uncovered serpentine tracks 15*a*, 15*b*, 15*c*, etc. Following these preparatory steps, the crystal 10 is mounted on a sample holder 16 by means of a suitable adhesive, such as silicone grease, and placed in the ion implantation apparatus, shown schematically in FIGURE 1.

The ion implantation apparatus basically comprises an ion source 20, mounted on the top of an accelerator tube 21. From the accelerator tube 21, ions, in the form of a beam 22, emerge and pass through a momentum analyzing system, such as analyzing magnet 23. The beam emerging from the analyzing magnet 23 is passed through a deflection system which may be composed of horizontal scanner plates 24 and vertical scanner plates 25. This deflection system is used to direct the beam such that it is focused on a screen plate 29 which has a suitably dimensioned aperture 30 therein. This screen is rigidly held in the evacuated chamber 26 in front of sample 10 by a suitable fixture 31. The sample holder 16, upon which body 10 is mounted, is fixed to an indexing assembly 27 which moves the assembly such that only one portion of the sample surface is exposed to the beam which is passing through the aperture 30.

This indexing system combined with the aperture permits precise control of the beam size falling on a specified area of the surface of the body. Such control assures that when the ion current passing through the aperture and impinging on the sample is maintained at a constant value, each irradiated portion of the sample receives exactly the same intensity of radiation. Alternatively, the current passing through the aperture may be integrated, using a commercially available electrometer device and the sample indexed after a predetermined charge has impinged upon the specified area of the sample surface. The aperture 30 in the mask is of such a size that only one area, for example, large area 31 surrounding resistor 15*b* is irradiated at a time.

Alternatively, the aperture 30 may be made of a metal mask of the desired serpentine shape 15 and the photoresist layer 13 may be omitted. This method ensures that exactly the same area is irradiated in each successive resistor and, when combined with use of a predetermined fixed charge, ensures that the same number of ions per square centimeter strikes each resistor.

The ions, of which the beam 22 is composed, strike the entire area being irradiated. However, they are prevented from entering the body or the oxide by the photoresist layer which is made thick to prevent the ions from passing through or alternatively, by the metal mask in the aperture 30. It is only in the track-like area 15*b* which is not covered that ions are implanted in the oxide and in the body to form in the body a region 28 of the desired resistance. The depth of penetration of a given species of ions into the sample body, in region 28, is a function of the energy of the impinging beam, the orientation of the crystal lattice of the substrate with respect to the beam, and the thickness of the passivating layer 12. The ion concentration at a specified depth in region 28 is a function of the length of time that a beam of a specified flux and energy continues to strike the irradiated surface. By controlling these variables, any desired concentration and penetration of ions may be implanted in the body. Preferably, the implanted ion concentration versus distance from the surface of layer 12 follows a normal distribution with its peak being well below this quartz-silicon interface 32.

Since the ion penetrates straight into the material into the desired depths and does not diffuse in the body of the silicon after implantation, the boundaries of the implanted region 28 are relatively sharp. In particular, the edge of the region may be controlled with great accuracy down to some few hundred atomic layers. The concentration gradient and the shape of the barrier junction, lying between the bulk and the implanted region, may be controlled in accordance with device design needs. The final resistive value of the implanted region is a function of the free carrier concentration, the width, length and depth of the ion implanted region and the subsequent heat treatment to which the device is subjected. To fully illustrate the interplay of all these variables, the following example should suffice.

In the normal course of events when a resistor is to be produced in a silicon substrate, several conditions are dictated by circumstances beyond the control of the designer. For example, in most instances the resistive value to be produced is established by the parameters of the circuit in which it is to be used; the resistivity of the substrate is established by the leakage permitted between the active components and finally the area available for implantation is determined by the circuit layout.

Thus, in the following examples, it will be assumed that the final resistance value is to be 100,000 ohms, the body 10 is P-type material whose resistivity is 100 ohm-cm. and the area available for implantation is 100 mils square. Phosphorus ions are selected for implantation in order to produce in P type body 10, a P-N junction between the implanted region and the bulk material. If body 10 had been initially of N type material boron would have been selected. Knowing that it is preferable to design the track 15 as wide as possible for purposes of reliability and reproducibility of final resistance value, a 10 mil width is chosen. The length of the resistor may be arbitrarily selected to be 300 mils folded to fit in the available area. The desired surface resistivity can then be obtained from the following equation:

$$p_s = R\frac{W}{L}$$

where $p_s$ is the surface resistivity of the implanted region, after partial or complete anneal, R is the resistance to be formed, W is the width of track 15 and L is the length of track 15. Using the described values for R, W and L, the desired value of $p_s$ is found to be 3333 ohms/square.

In general, when ions are implanted by the described irradiation technique, they go into interstitial positions and give a high initial resistivity. Heating of the crystal lattice at temperatures well below the diffusion temperatures, imparts sufficient energy to be implanted ions to move them into substitutional positions. The number of ions so moved determines the final resistivity of the implanted region.

Figure 5:
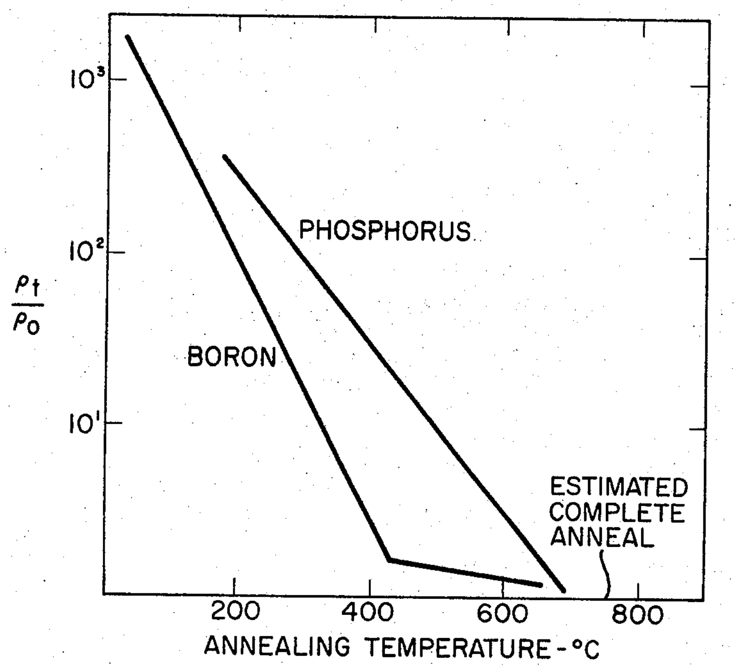
FIGURE 5 shows a curve which depicts the decrease of sheet resistivity with annealing temperature.

FIGURE 5 shows typical behavior as found for half hour isochronal annealing in the case of boron and one hour isochronal annealing in the case of phosphorus. In this figure $p_t$ is the surface resistivity of the implanted region after annealing to a specified temperature T. The number of ions transferred to substitutional positions increases irreversibly with temperature until all ions have become substitutional, as indicated by the lack of further decrease in resistivity above 700° C. in FIGURE 5.

Figure 6:
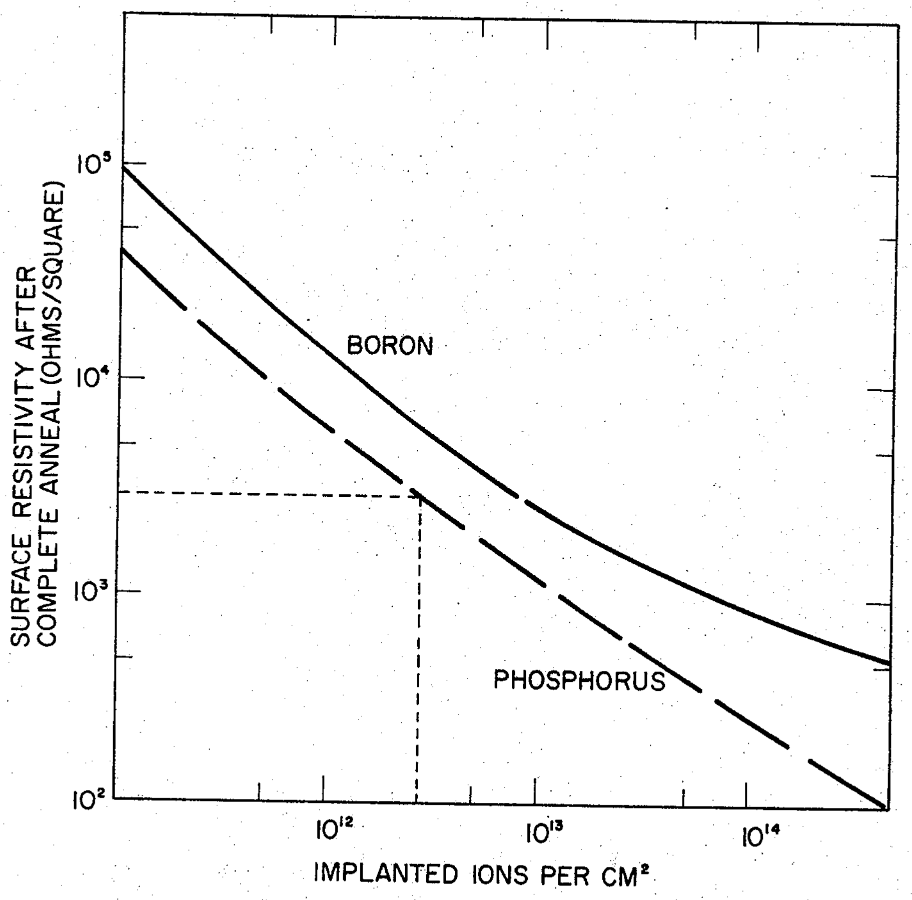
FIGURE 6 shows a curve which depicts resistivity versus ion concentration.

In FIGURE 6 the saturation value of surface resistivity $p_0$ obtained after complete annealing is shown as a function of the number of ions implanted per square centimeter.

By referring to FIGURE 6 it can be observed that a resistivity of 3333 ohms/square is obtained when $3\times10^{12}$ phosphorus ions/cm.$^2$ are substituted for the lattice atoms of the bulk material and complete annealing is used. However if complete annealing is used no method of adjusting the final value of the resistor is available. For this reason an excess number of ions can be initially implanted and the final resistivity of the implanted region can be tailored by partial annealing to specific requirements. Thus in the given example an ion flux of $5\times10^{13}$ phosphorus ions/cm.$^2$ is selected. As can be observed from FIGURE 6 this would upon total annealing produce a resistivity of about 300 ohms/square. However, a partial annealing at 500° C. for 1 hour will produce the desired resistivity of 3333 ohms/square.

The required accuracy in annealing temperature may be estimated by reference to FIGURE 5. In this figure the resistivity $p_t$ after annealing at temperature T approaches the value $p_0$ after complete annealing approximately according to the equation:

$$\frac{p_t - p_0}{p_0} = Ae^{-\frac{T}{K}},$$

where A is $10^{-4}$ and K is 70° Kelvin. The rate of change in $p_t$ may be calculated from this equation yielding $$\frac{\Delta p_t}{p_t} = -\left(1 - \frac{p_0}{p_t}\right)\frac{\Delta T}{K}$$

With a value of 0.9 for the terms in the parenthesis, corresponding to the resistivities of the example, this expression gives a tolerable error of about 1° C. in annealing temperature for 1% accuracy in $p_t$ and hence in the final resistance of the device.

Once the desired ions flux has been established the body 10 is placed in the apparatus shown in FIGURE 1 and irradiated. A satisfactory depth of ion penetration, say in the 0.5 micron range, is achieved using ions having an energy between 50 and 100 keV.

Following the irradiation of the sample, the slice of silicon is removed from the holder and dipped in a solution, such as trichlorethylene, which removes the silicon grease and photoresist from the surfaces of the slice. After degreasing the slice is annealed as above described by heating it to the desired temperature for one hour.

Upon removal of the slice from the annealing furnace, it is permitted to cool to room temperature, 26° C., after which it is again masked by photoresist. The mask so provided leaves exposed areas 90, 91 and 92. The entire unit is then dipped in a standard etching solution so that the oxide in the exposed regions is removed by the etching solution. Once these areas of oxide are removed, metal contacts 80 and 81, such as indium or aluminum are alloyed into areas 90 and 91 to make contact with the ends of the implanted track 15. Leads 94 and 95 are then thermocompression bonded to the metal contacts by methods well known to the art.

The assembly is then placed in a resistance measuring test set, not shown, and the actual resistance of the unit measured. If the resistance is within 0.1% of the desired 100,000 ohm resistance, nothing further is done. If, however, the resistance is greater than the desired value, a probe 98 is placed in area 92 and in contact with the exposed surface of the unit. Once contact is made, a pulse of current from a suitable source (not shown) sufficient to cause localized heating of the unit is passed through the device between the probe 98 and base contact 99. This localized heating is shown in FIGURES 3 and 7 by the circle in phantom 93, which extends radially outward from the point from the area 92. As can be seen from this view, this localized heating extends over a portion of the implanted region. Because of the annealing action of this heat pulse the sheet resistance of those reheated implanted areas is decreased slightly. Since the effect caused by heating of the unit is irreversible the sheet resistance can only decrease. Following the initial probing and localized heating, the unit is again tested. If the value of the unit is still not correct, another pulse is applied and the unit tested. This procedure is repeated until the value of the resistance is within the proper range. In this manner, the unit can be made 0.1% of the specified value of 100,000 ohms. By proper selection of initial annealing temperature from the curve of FIGURE 5, none of the units made in any single slice of material will exceed the desired value.

The described technique of producing resistors in silicon slices using ion implantation has a number of advantages over methods used in the prior art. The present invention not only obviates precise machining of the units but permits devices to be made which exceeds the tolerance values of anything available in the prior art. Furthermore, this method produces resistors, which may be readily trimmed to values which are within 0.1% of the specified value. Since such close control of the resistance value is obtained by control of the number of introduced dopant ions in the silicon body it is necessary that the number of ions implanted be closely controlled. This is done by providing uniform beam flux and constant beam direction with respect to the sample being implanted. This control of the beam is made possible by use of the beam control electrode 29 and the described indexing system 27. The manipulation of the accuracy of the resistor by means of the annealing temperature further permits precise control of the device within $\frac{1}{10}$th of 1%.

It should of course be understood that, although a device with a resistance of 100,000 ohms was described in the above embodiment of the invention, many other values of resistance can be made and that these values would be dependent upon the number of ions implanted, the width of the track, the length of the track, and the temperature to which the unit was annealed.

In addition to the ions implanted in the described example, many other ions such as gold, nickel, and copper as well as other well known semiconductor dopants such as aluminum, gallium, thallium, nitrogen, arsenic, and antimony may be used with advantage. Also, it should be understood that this technique is not limited to silicon but may be satisfactorily used with all the well-known semiconductors such as germanium and silicon carbide, and may also be used with appropriate doping ions and the III–V and II–VI compounds, such as gallium arsenide, indium antimonide, and cadinium selenide.

Furthermore the track may have any convenient configuration. Preferably however it would be in the form of a fret, that is it would consist of a number of small straight bars intersecting one another in right or oblique angles.

It is, therefore, believed that other various embodiments and modifications will now become apparent to those skilled in the art, and it is respectfully requested that, since there has been described one complete method of producing such resistive devices, the invention so described be limited only by the following claims.

What is claimed is:

1. A passive semiconductive device comprising a body of crystalline semiconductor material of a first conductivity type and a known bulk resistivity, at least one region of implanted ions of given dimensions in said body, said region containing ions in both interstitial and substitutional positions, said region having a conductivity opposite to the conductivity of the body and a specified resistivity different from said bulk resistivity, said specified resistivity being determined by the number of ions in substitutional positions in said crystal and conductive leads connected to said region.

2. The device of claim 1 wherein said substitutional and interstitial ions are uniformly distributed throughout said region.

3. The device of claim 2 wherein said substitutional and interstitial ions are non-uniformly distributed through said region.

4. The method of producing a passive electrical component comprising the steps of depositing on the surface of a semiconductive body, of known conductivity and resistivity, a tenacious passivating layer, masking said tenacious layer to leave exposed selected portions thereof, implanting said layer and body with ions having the capacity to exist interstitially or substitutionally in said body, said ions being of a given energy in excess of 50 kev and conductivity to modify the conductivity and resistivity of the unmasked regions of said body, removing said mask, remasking said layer to leave exposed different portions thereof, removing said exposed different portions of said layer to expose the surface of the body, coupling conductive leads to said exposed body surfaces and heat treating said body at a temperature below 800° C.

5. The method of claim 4 wherein said heat treating comprises heating said body to a temperature greater than 25° C. but less than 800° C.

6. The method of claim 4 wherein said heat treatment comprises applying electrical pulses to said body.

7. The method of claim 4 wherein said implantation provides a P-N junction between the implanted layer and the remainder of the body.

8. The device of claim 1 wherein said region has a non crystalline passivating surface layer and said layer contains said ions.

References Cited

UNITED STATES PATENTS

| | | | |
|---|---|---|---|
| 2,787,564 | 4/1957 | Shockley | 148—1.5 |
| 2,803,569 | 9/1957 | Jacobs | 148—1.5 |
| 3,076,732 | 2/1963 | Tanenbaun | 148—1.5 |
| 3,209,214 | 9/1965 | Murphy | 317—234 |

JOHN W. HUCKERT *Primary Examiner.*

M. EDLOW, *Assistant Examiner.*